United States Patent [19]
Kato et al.

[11] Patent Number: 6,050,397
[45] Date of Patent: Apr. 18, 2000

[54] CONVEYOR CHAIN UNIT AND CONVEYOR CHAIN

[75] Inventors: Fukukazu Kato; Tsuyoshi Nakamura, both of Tokyo; Keiji Ohara, Musashino, all of Japan

[73] Assignee: Yamakyu Chain Kabushiki Kaisha, Tokyo, Japan

[21] Appl. No.: 08/844,889

[22] Filed: Apr. 22, 1997

[30] Foreign Application Priority Data

Nov. 29, 1996 [JP] Japan ................................. 8-318982

[51] Int. Cl.[7] ................................................ B65G 17/06
[52] U.S. Cl. ........................................... 198/853; 198/851
[58] Field of Search ................................. 198/851, 853, 198/852

[56] References Cited

U.S. PATENT DOCUMENTS

| | | | |
|---|---|---|---|
| 5,020,659 | 6/1991 | Hodlewsky | 198/853 |
| 5,215,185 | 6/1993 | Counter et al. | 198/853 |
| 5,253,749 | 10/1993 | Ensch | 198/853 |
| 5,293,989 | 3/1994 | Garbagnati | 198/853 |
| 5,303,818 | 4/1994 | Gruettner et al. | 198/853 |
| 5,361,893 | 11/1994 | Lapeyre et al. | 198/853 |
| 5,379,883 | 1/1995 | Damkjaer | 198/853 |
| 5,613,597 | 3/1997 | Palmaer et al. | 198/853 |

*Primary Examiner*—William E. Terrell
*Assistant Examiner*—Mark Deuble
*Attorney, Agent, or Firm*—Kilpatrick Stockton LLP

[57] ABSTRACT

A conveyor chain unit possessing a central straight rib extending longitudinally from one end of the unit to the other end. The rib has a vertical height extending from the conveying surface to the bottom surface of the unit. A plurality of pairs of vertical side walls extend from the rib perpendicular to through-holes to form projections. The projections are positioned alternately on opposite sides of the rib having equal interval spacing. The number of the projections on one side is even and identical to the projections on the opposite side. At least one pair of projections positioned on opposite sides of the rib have recesses that are formed at the rib, and the projections are connected along the full height of the rib and spaced in a manner that chain units may be coupled together interchangeably via projections on either side of the rib. cylindrical barrels are formed between the vertical side walls at the end of the pair of the projections for the engaging sprocket teeth contacting the cylindrical barrel to drive the chain unit bidirectionally.

2 Claims, 3 Drawing Sheets

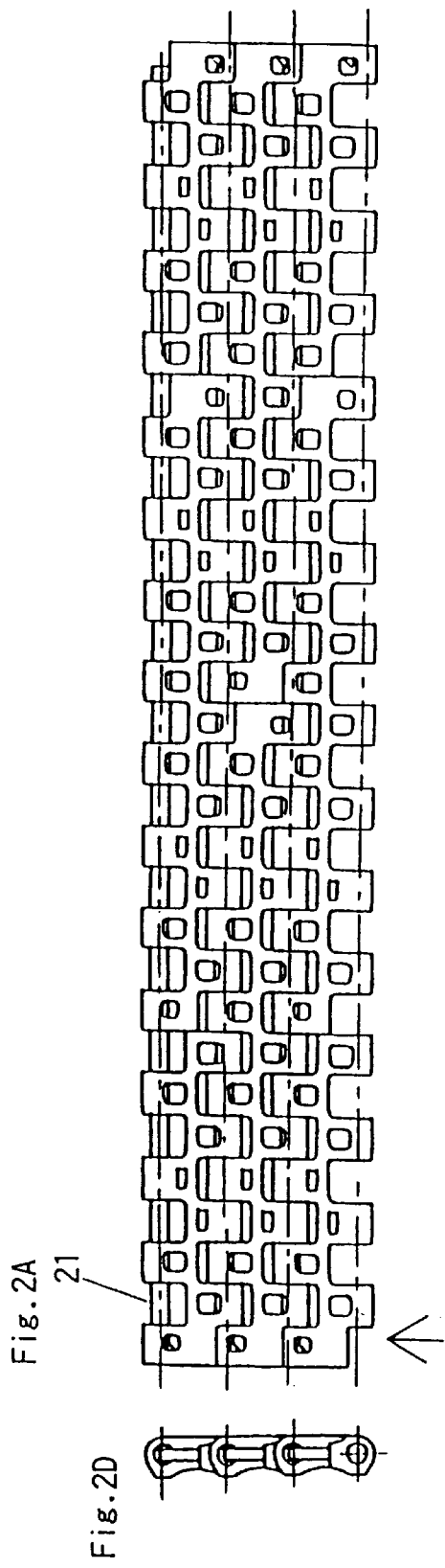
Fig.2A  21
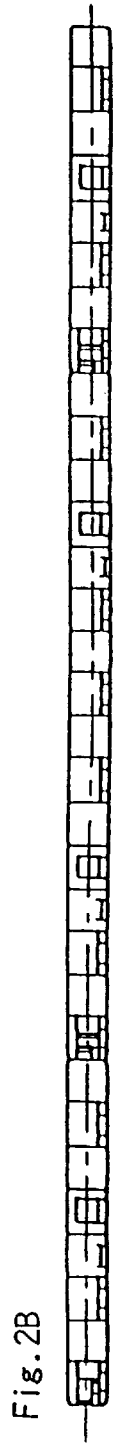
Fig.2B
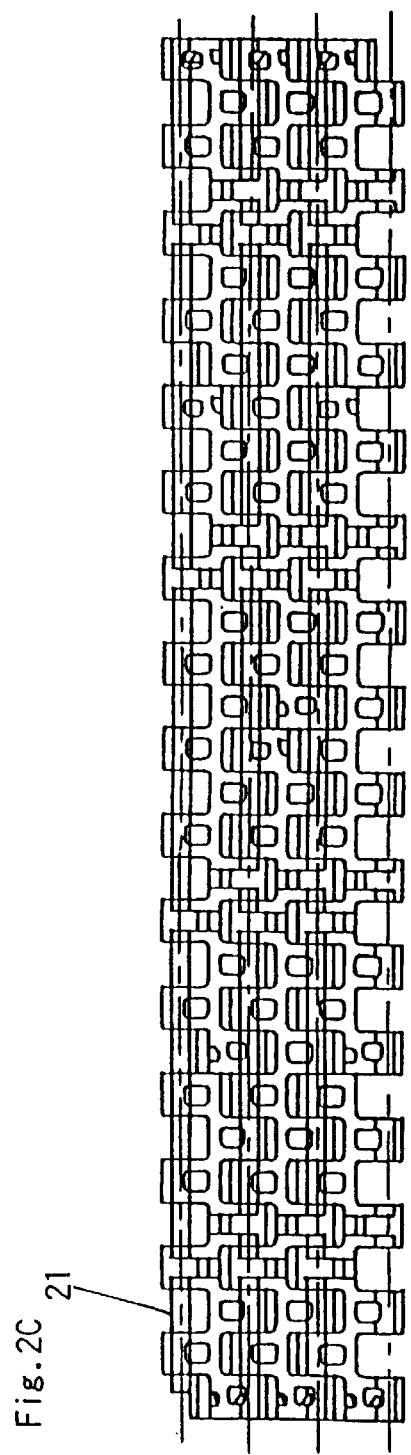
Fig.2C  21
Fig.2D

CONVEYOR CHAIN UNIT AND CONVEYOR CHAIN

BACKGROUND OF THE INVENTION

1. Field of the Invention

The present invention relates to a plurality of types of conveyor chain units (hereinafter simply referred to as the chain units) and a conveyor chain constructed of the plurality of types of the chain units, wherein the plurality of types of chain units are connected widthwise to form the conveyor chain which may vary in width of its conveying surface, depending upon the number and the types of the chain units used therein. More particularly, the present invention relates to two types of the chain units and a conveyor chain constructed of these two types of the chain units.

2. Description of the Prior Art

It is well known to form a conveyor chain by connecting widthwise a plurality of types of chain units which are generally made of plastic, wherein the conveyer chain may vary in width, depending on the number and the types of the chain units used therein.

In case of a conventional conveyor chain such as on described above, a chain unit used in each of opposite sides of the conveyor chain serves as a side member of the conveyor chain, and must receive a plug which is engaged with a connecting rod or pin for connecting adjacent chain units with each other. Consequently, the chain units used in the opposite side of the conveyor chain are different in type from those (i.e., intermediate chain units) used in an intermediate portion of the conveyor chain. Namely, in the conventional conveyor chain, at least two different types of the chain units are required. Consequently, when two types of the chain units, which are different in width to form a first and a second chain unit, are required in use, it is necessary to prepare at least four different types of the chain units, two of which are for the first chain unit to serve as a side member and an intermediate member of the conveyor chain constructed of the first chain unit, and the remaining two are for the second chain unit and serve as a side member and an intermediate member of the conveyor chain constructed of the second chain unit.

On the other hand, when the conveyor chain is constructed of two types of chain units one of which serves as a side member of the conveyor chain and the other serves as an intermediate member of the conveyor chain, adjacent side members of the conveyor chain are considerably separated widthwise from each other and have their pins exposed to the outside. These are disadvantages inherent in the conventional conveyor chain. Further, in the conventional conveyor chain, a plurality of chain units are connected widthwise to form a wide conveyor chain, which imposes a heavy load on a power train of the conveyor chain, so that a powerful motor is required. Due to such heavy load, it is also necessary for the conventional conveyor chain to increase its rigidity and has each of their chain units increased in thickness in construction.

As described above, it is necessary for the conventional wide conveyor chain to prepare a large number of its components, which increases tooling cost and stock control cost of the conveyor chain. Further, the assembling operations of the conventional conveyor chain take too much time and labor, which increases the manufacturing cost thereof.

SUMMARY OF THE INVENTION

It is an object of the present invention to provide a plurality of types of conveyor chain units (hereinafter simply referred to as the chain units) and a conveyor chain constructed of the plurality of types of the chain units, wherein the plurality of types of chain units are connected widthwise to form the conveyor chain which may vary in width of its conveying surface, depending on the number and the types of the chain units used, wherein the number of the types of the chain units used in the present invention are only two which are combined as needs require, without exposing their connecting pins to drive gears of the conveyor chain, wherein the chain units have their outer side end shapes so formed into ones capable of keeping their lateral clearances minimum when combined, wherein the conveyor chain has its side and bottom surfaces improved in wear resistance without increasing the thickness of plastic used therein, but by having its chain units improved in shape in design according to a new technical concept.

The above object of the present invention is accomplished by providing:

In a conveyor chain unit provided with a central straight rib portion from which the same even number of projections each with a predetermined width extend in opposite directions perpendicular to a longitudinal axis of the rib portion, the projections being spaced apart from each other at equal intervals while staggered along the longitudinal axis of the rib portion, the improvement wherein:

each of a pair of side wall portions, which form the projection, is provided with a through-hole for passing therethrough a connecting rod extending in parallel to the longitudinal axis of the rib portion, through which rod the chain units are connected with each other;

of the projections, each of outmost ones, which are disposed in opposite outer side end portions of the chain unit, has its conveying surface connected with the side wall portion of adjacent one of the projections disposed in the opposite side with respect to the rib portion, so as to minimize a clearance appearing in the connections in the conveying surface in the side end portion of the conveyor chain when a plurality of the chain units are connected with each other, the projection being provided with a groove and the through-hole extending in a direction perpendicular to the groove, wherein the groove receives a plug in a manner such that the plug is completely embedded in the groove in the outer side end surface of the chain unit, the plug retaining the connecting rod and being fixed in the through-hole;

the number of types of the chain units are two, one of which is a first chain unit with a basic width, and the other a second chain unit with half the basic width of the first chain unit, the number of the projections of the second chain unit being half the number of the projections of the first chain unit, wherein a plurality of the first and the second chain units are connected widthwise with each other to form a conveyor chain with a desired width equal to an integer multiple of a width of the second chain unit.

On the other hand, in the bottom of the chain unit, a concave portion is provided in the rib portion surrounded by the side wall portions of the projections. Each of the projections has its portion, which corresponds to the concave portion of the rib portion, formed into a cylinder portion through which the connecting rod passes, whereby a driving sprocket for driving the conveyor chain enters the concave portion of the rib portion to abut against the cylinder portion of the projection, which enables the conveyor chain to endure great drive stress and enables the same driving sprocket to rotate in the forward and the reverse direction.

Further, the bottom surface of the chain unit is formed into a curved, i.e., circular-arc surface extending from the rib portion to each of the opposite projections thereof. When the chain units are assembled into the conveyor chain, the bottom surfaces of the chain units of the conveyor chain are brought into area contact with a corner guide a radius of which is a predetermined value, which eliminates uneven wear to improve the bottom surfaces of the chain units in wear resistance.

BRIEF DESCRIPTION OF THE DRAWINGS

FIG. 2A is a plan view of the conveyor chain of the present invention, wherein a plurality of the chain units shown in FIG. 1A are connected widthwise with each other to form the conveyor chain;

FIG. 2B is a side view of the conveyor chain shown in FIG. 2A, looking in the direction of the arrow of FIG. 2A;

FIG. 2C is a bottom view of the conveyor chain shown in FIG. 2A;

FIG. 2D is a side view of the conveyor chain shown in FIG. 2A; and

DESCRIPTION OF THE PREFERRED EMBODIMENTS

Hereinbelow, an embodiment of a conveyor chain unit (hereinafter simply referred to as the chain unit) of the present invention and an embodiment of a conveyor chain constructed of a plurality of these chain units, which are connected widthwise with each other to form the conveyor chain, will be described in detail with reference to the accompanying drawings.

Figure 1A:
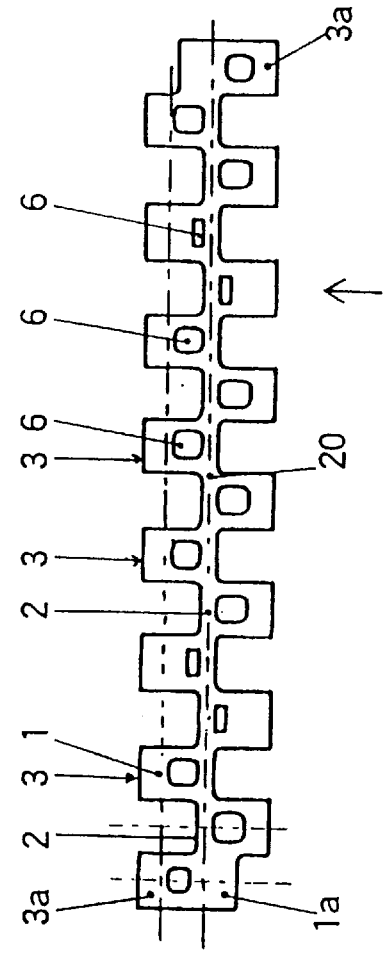
FIG. 1A is a plan view of the conveyor chain unit of the present invention.
Figure 1B:
FIG. 1B is a side view of the conveyor chain unit shown in FIG. 1A, looking in the direction of the arrow of FIG. 1A.
Figure 1C:
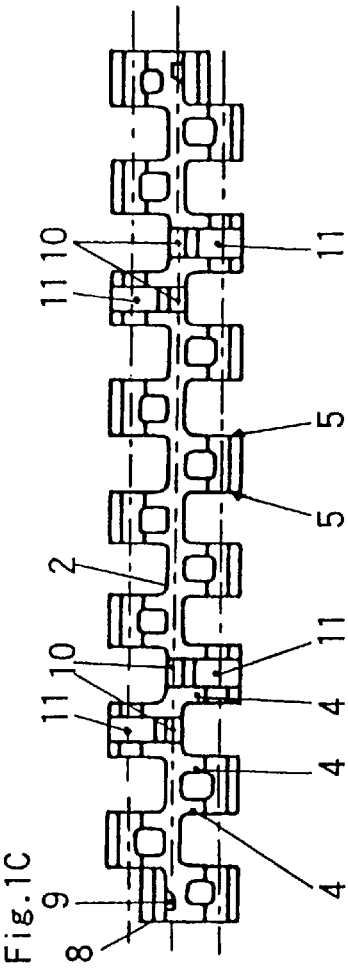
FIG. 1C is a bottom view of the conveyor chain unit shown in FIG. 1A.

FIGS. 1A, 1B and 1C show an embodiment of the chain unit of the present invention. Of these drawings, FIG. 1A shows a conveying surface 1 of the chain unit.

As viewed in FIG. 1A, the chain unit of the present invention is symmetric about the center 20 of the conveying surface 1, which makes it possible for the chain units to be connected with each other and to form a conveyor chain provided with a desired width.

The chain unit of the present invention is provided with a central straight rib portion 2 from which the same even number of projections 3 each with a predetermined width extend in opposite directions perpendicular to a longitudinal axis of the rib portion 2. These projections 3 are spaced apart from each other at equal intervals while staggered along the rib portion 2, as shown in FIG. 1A.

The chain unit of the present invention having the above construction is improved as follows.

Each of a pair of side wall portions 4, which form the projection 3, is provided with a through-hole 5 for passing therethrough a connecting rod 21 (shown in FIGS. 2A and 2B) extending in parallel to the longitudinal axis of the rib portion 2. Through such connecting rod 21 the chain units of the present invention are connected with each other.

Although the conveying surface 1 is generally flat, it is also possible for the conveying surface 1 to assume any other shape depending upon its application. For example, the conveying surface 1 may be provided with at least one opening assuming a desired shape. Further, the conveying surface 1 may be provided with any desired accessory, for example such as rib-like or button-like members, pushing members, side-guide members, magnet plates, rubber segments and like accessories, depending upon articles to be conveyed thereon.

Of the projections 3, each of outmost ones 3a, which are disposed in opposite outer side end portions of the chain unit, has its conveying surface 1a connected with the side wall portion 4 of adjacent one of the projections 3 disposed in the opposite side with respect to the rib portion 2, so as to minimize a clearance appearing in the connections in the conveying surface 1a in the side end portion of the conveyor chain when a plurality of the chain units are connected with each other, as shown in FIG. 2A.

The projection 3 is provided with a groove 7 and the through-hole 5 extending in a direction perpendicular to the groove 7, wherein the groove 7 receives a plug (shown in FIG. 3) in a manner such that the plug is completely embedded in the groove 7 in the outer side end surface of the chain unit. The plug retains the connecting rod 21 and is fixed in the through-hole 5.

The number of types of the chain units are two, one of which is a first chain unit with a basic width, and the other a second chain unit with half the basic width of the first chain unit, the number of the projections of the second chain unit being half the number of the projections of the first chain unit, wherein a plurality of the first and the second chain units are connected widthwise with each other to form a conveyor chain with a desired width equal to an integer multiple of a width of the second chain unit.

On the other hand, in the bottom of the chain unit, a concave portion 10 is provided in the rib portion 2 surrounded by the side wall portions 4 of the projections 3. Each of the projections 3 has its portion, which corresponds to the concave portion 10 of the rib portion 2, formed into a cylinder portion through which the connecting rod 21 passes, whereby a driving sprocket for driving the conveyor chain enters the concave portion 10 of the rib portion 2 to abut against the cylinder portion of the projection 3, which enables the conveyor chain to endure great drive stress and enables the same driving sprocket to rotate in the forward and the reverse direction.

Figure 1D:
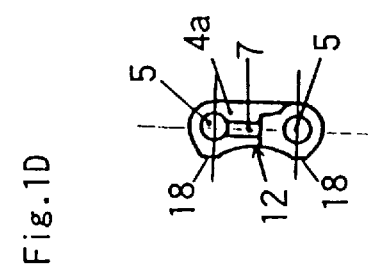
FIG. 1D is a side view of the conveyor chain unit shown in FIG. 1A.

Further, as shown in FIG. 1D which is a side view of the chain unit shown in FIG. 1A, the bottom surface of the chain unit is formed into a curved, i.e., circular-arc surface. This circular-arc surface, the center of which is denoted by the reference numeral 12 in FIG. 1D, extends from the rib portion 2 to each of the opposite projections 3 thereof. When the chain units are assembled into the conveyor chain, the bottom surfaces of the chain units of the conveyor chain are brought into area contact with a rod-like corner guide a radius of which is a predetermined value, which eliminates uneven wear to improve the bottom surfaces of the chain units in wear resistance.

When the conveyor chain travels in a plane, a pair of flat surface portions 18 (shown in FIG. 1D) of each of the chain units slide on a conveyor table.

As shown in FIG. 2A, a plurality of the chain units described above are connected widthwise with each other to for the conveyor chain, a plan view of which is shown in FIG. 2A. More particularly, as described in the above, since the number of types of the chain units are two, one of which is the first chain unit with the basic width and the other the second chain unit with half the basic width of the first chain unit, the number of the projections of the second chain unit is half the number of the projections of the first chain unit. Consequently, a plurality of the first and the second chain units are connected widthwise with each other to form a conveyor chain with a desired width equal to an integer multiple of a width of the second chain unit.

In the embodiment of the conveyor chain of the present invention shown in FIG. 2A, these two types of the chain units are staggered in arrangement along its traveling path to improve the conveyor chain in resistance to widthwise applied stress.

The connecting rod 21 for connecting the chain units is generally constructed of a plastic rod, a length of which depends upon the width of the conveyor chain.

The details of the plug described above are shown in FIG. 3. The plug is provided with a pair of hooks 13, 14 and a connecting portion 15 therebetween. In order to facilitate the assembling operations of the conveyor chain, the connecting portion 15 of the plug has one of its opposite ends extend beyond the hook 13 to form an extension 16. In the assembling operations of the conveyor chain, the hook 13 with the extension 16 of the plug is pushed into the through-hole 5 shown in FIG. 1D. On the other hand, the other hook 14 of the plug is fitted into a lateral groove 9 which is provided in an end portion of the rib portion 2 of the chain unit. Consequently, since the plug is hooked at its opposite hooks 13, 14 without fail, there is no fear that the plug drops out of the chain unit.

Figure 3:
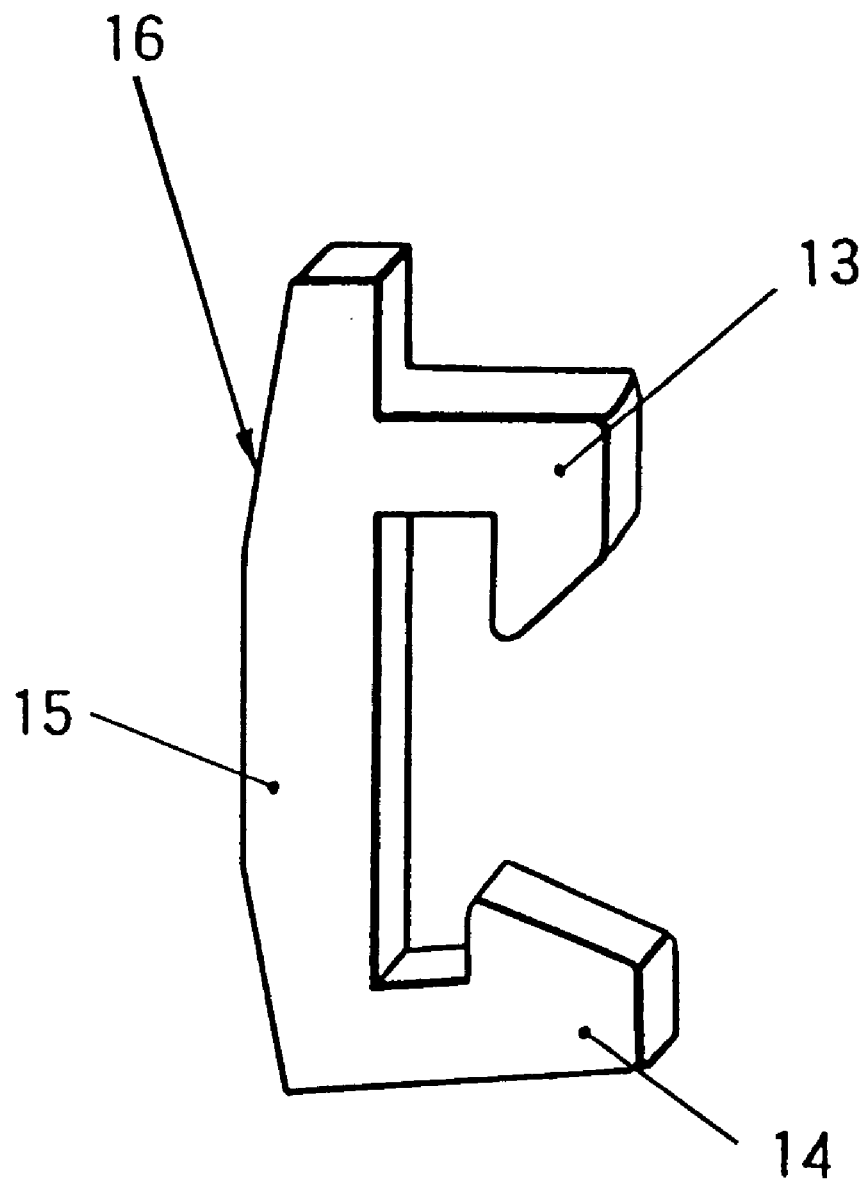
FIG. 3 is a perspective view of the plug for holding the connecting rod through which the conveyor chain units are connected with each other to form the conveyor chain of the present invention.

Further, since the connecting portion 15 of the plug has its back curved inwardly as shown in FIG. 3, there is no fear that the plug hits against other objects such as external projections and the like to drop out of the chain unit. In addition, since it is possible for a workman to mount the plug on the side surface of the conveyor chain, the plug is excellent in workability in the assembling operations of the conveyor chain.

As described above, in the present invention, only two types of the chain units, one of which types is used as the outmost chain units in the conveyor chain, are assembled into the conveyor chain the width of which may vary, depending upon the number of the chain units used in the conveyor chain.

Even when the conveyor chain of the present invention is large in width, the conveyor chain of the present invention sufficiently withstands the drive stress imposed on its portion abutting against the driving sprocket. In addition, the conveyor chain of the present invention permits the same driving sprocket to rotate in the forward and the reverse direction.

Further, the conveyor chain of the present invention has its side and bottom surfaces improved in wear resistance without increasing the thickness of plastic used therein, but by having its chain units improved in shape according to a new technical concept. Consequently, the conveyor chain of the present invention is considerably light in weight and excellent in durability.

Further, in the conveyor chain of the present invention, there is no need of preparing various types of the chain units, which makes it possible to decrease tooling cost and stock control cost. In addition, since the number of the types of the chain units used in the conveyor chain of the present invention is only two, this fact facilitates the assembling operations of the conveyor chain, and permits a considerable reduction in the manufacturing cost.

What is claimed is:

1. A conveyer chain unit having a length, a top surface, and a bottom surface, comprising:

one central straight rib having a longitudinal axis, the rib extending the length of the conveyor unit and having a height from the top surface of the conveyor unit to the bottom surface of the conveyor unit; and an equal and even number of projections extending perpendicularly to the longitudinal axis of the rib in a first direction and a second direction from the rib, wherein the first direction is opposite to the second direction, wherein each projection has a top surface and a bottom surface; wherein the projections each have an equal width; and wherein the conveyor chain unit includes outermost projections;

wherein the projections are spaced apart from each other at equal intervals and staggered in opposite directions along the longitudinal axis of the rib;

wherein each projection is formed by a pair of vertical side walls extending in parallel to each other, each side wall being perpendicular and connected along the full height of the rib;

wherein the top surface of each projection forms a portion of a conveying surface;

wherein the side walls of each projection are provided with a through-hole for passing therethrough a connecting pin to connect the chain unit with a second chain unit via the projections extending a first direction from the rib;

wherein the rib is provided with recesses between the side walls of at least a pair of projections for allowing sprocket teeth to engage and enter therein;

wherein a cylindrical barrel is formed between and fully connected to the two vertical side walls of said pair of projections for engaging sprocket teeth such that the chain unit may be driven bidirectionally and is installable by joining the projections from forward and rear side interchangeably; and wherein the chain unit comprises a plug, and wherein the outermost projections each comprise a first lateral groove extending perpendicularly to the through-hole; wherein the rib includes a second groove for receiving the plug; wherein the plug comprises a bridge portion and first and second extensions, such that the plug has substantially a U-shape, each of the extensions having a hook; and wherein, when the plug is assembled in the chain unit, the bridge portion is embedded in the first lateral groove, the hook of the first extension is held in the second groove and the hook of the second extension is held in the through-hole of the outermost projection.

2. A conveyor chain assembly, comprising:

a first conveyor chain unit having a length, a top surface, a bottom surface, and two connecting sides, the first conveyor or chain unit comprising:

one central straight rib having a longitudinal axis, the rib extending the length of the conveyor unit and having a height from the top surface of the conveyor unit to the bottom surface of the conveyor unit; and an even and equal number of projections extending perpendicularly to the longitudinal axis of the rib in a first direction and a second direction from the rib, wherein the first direction is opposite to the second direction, wherein each projection has a top surface and a bottom surface, and wherein the projections each have an equal width;

wherein the projections are spaced apart from each other at equal intervals and staggered in opposite directions along the longitudinal axis of the rib;

wherein each projection is formed by a pair of vertical side walls extending in parallel to each other, each side wall being perpendicular and connected along the full height of the rib;

wherein the top surface of each projection forms a portion of a conveying surface;

wherein the side walls of each projection are provided with a through-hole for passing therethrough a connecting pin to connect the chain unit with a second chain unit via the projections extending a first direction from the rib; and wherein the rib is provided with recesses between the side walls of at least a pair of projections for allowing sprocket teeth to engage and enter therein, and wherein a cylindrical barrel is formed between and fully connected to the two vertical side walls of said pair of projections for engaging sprocket teeth such that the chain unit may be driven bidirectionally and is installable by joining projections to each connecting side of the first chain unit interchangeably; and a second unit having a plurality of projections, wherein the second chain unit has half the width of the first chain unit, the second chain unit comprising:

half the number of the projections of the first unit, a first plurality of the projections of the second chain unit extending perpendicularly to a longitudinal axis of a rib of the second chain unit and a second plurality of projections extending perpendicularly to the longitudinal axis of the rib of said first chain unit in an opposite direction from the first plurality;

wherein said first chain unit and said second chain unit are connected in the longitudinal axis direction to form a row chain unit assembly with a predetermined width;

wherein a plurality of the row chain unit assemblies may be connected with a connecting pin passing through the through-holes of the projections of said first chain unit and said second chain unit;

wherein each chain unit has two outermost projections;

wherein each of the outermost projections are disposed at opposite ends of the unit and on opposite sides with respect to the rib;

wherein each of the outermost projections has a top surface extension, such that the extension extends over the rib to an edge, such that the edge abuts the outermost end projection of the connected second conveyor chain unit, and such that a clearance at the conveying surface formed by the top surfaces of the projections between the chain unit and the second chain unit outermost end projections is minimized;

wherein the chain unit comprises a plug, and wherein the outermost projections each comprise a first lateral groove extending perpendicularly to the through-hole; wherein the rib includes a second groove for receiving the plug; wherein the plug comprises a bridge portion and first and second extensions, such that the plug has substantially a U-shape, each of the extensions having a hook; and wherein, when the plug is assembled in the chain unit, the bridge portion is embedded in the first lateral groove, the hook of the first extension is held in the second groove and the hook of the second extension is held in the through-hole of the outermost projections.

* * * * *